(12) United States Patent
Chen et al.

(10) Patent No.: US 10,384,563 B1
(45) Date of Patent: Aug. 20, 2019

(54) PROTECTION COVER OF BATTERY BOX OF ELECTRIC VEHICLE

(71) Applicant: KWANG YANG MOTOR CO., LTD., Kaohsiung (TW)

(72) Inventors: Yi-Tso Chen, Kaohsiung (TW); Jung-Chiang Chen, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/247,582

(22) Filed: Jan. 15, 2019

(30) Foreign Application Priority Data

Jan. 31, 2018 (TW) .............................. 107103534 A

(51) Int. Cl.
*B60K 1/04* (2019.01)
*B60L 50/64* (2019.01)
*H01M 2/10* (2006.01)
*B60L 50/60* (2019.01)

(52) U.S. Cl.
CPC .............. *B60L 50/64* (2019.02); *B60L 50/66* (2019.02); *H01M 2/1083* (2013.01); *B62K 2202/00* (2013.01); *B62K 2208/00* (2013.01)

(58) Field of Classification Search
CPC .................. B60K 1/04; B60K 2202/00; B60K 2001/0488; B60K 2001/0416; B60L 50/64; B60L 50/66; B60R 25/40; H01M 2/1083

See application file for complete search history.

(56) References Cited

U.S. PATENT DOCUMENTS

| | | | | |
|---|---|---|---|---|
| 3,252,537 A * | 5/1966 | Tarran | ...................... | B62J 35/00 180/225 |
| 4,721,178 A * | 1/1988 | Ito | ............................ | B62M 7/06 180/215 |
| 6,722,460 B2 * | 4/2004 | Yang | ........................ | B62M 7/12 180/220 |
| 8,919,483 B2 * | 12/2014 | Buell | ....................... | B60K 6/46 180/219 |
| 2003/0230440 A1 * | 12/2003 | Kamen | ................... | F24D 15/04 180/65.245 |
| 2006/0032689 A1 * | 2/2006 | Kojima | .................... | B60K 6/44 180/219 |
| 2011/0259660 A1 * | 10/2011 | Johnson | ................. | B62K 11/04 180/220 |

* cited by examiner

*Primary Examiner* — James A Shriver, III
*Assistant Examiner* — James J Triggs
(74) *Attorney, Agent, or Firm* — Leong C. Lei

(57) ABSTRACT

An electric vehicle includes a frame unit and a vehicle body cover unit. The frame unit includes tread tubes extending toward a rear side of a vehicle body and arranged pairwise as a left tread tube and a right tread tube. The vehicle body cover unit includes a tread board that shields the left and right tread tubes. The frame unit receives a battery box that receives and holds therein a battery and has two sides provided with support shafts to be pivotally supported thereon. The battery box is shaft-supported by the support shafts on the frame unit. The battery box includes a battery access opening, which is provided with a protection cover that covers and closes the battery access opening. The battery is securely held in the battery box without being moved by inertial forces. Dust resistance of the battery box can be improved.

13 Claims, 14 Drawing Sheets

PROTECTION COVER OF BATTERY BOX OF ELECTRIC VEHICLE

(A) TECHNICAL FIELD OF THE INVENTION

The present invention generally relates to a protection cover of a battery box of an electric vehicle, and more particularly to a protection cover of a battery box of an electric vehicle that provides a battery with a secured storage position in the battery box and enhances improves dust resistance of the battery box to thereby improve utilization of the electric vehicle.

(B) DESCRIPTION OF THE PRIOR ART

An electric vehicle 1 is provided with a receiving space 12 under a tread board 11 that is arranged for supporting a vehicle operator's feet to rest thereon. As shown in FIG. 1, the receiving space 12 receives and holds therein a battery 13 that supplies electrical power source to the electric vehicle 1.

As shown in FIGS. 1 and 2, the battery 13 is received and held in a battery box 14. The battery 13 has certain weight and volume. In addition, the electric vehicle 1 must keep a predetermined height above the ground so that the battery 13, together with the battery box 14, is generally arranged in a lying condition in the receiving space 12 under the tread board 11. In order to provide the tread board 11 with a desired structural strength to support the vehicle operator's feet resting thereon, a reinforcement member 15 is provided between the tread board 11 and the receiving space 12. With the arrangement of the reinforcement member 15, the structural strength of the tread board 11 is improved.

The known battery box 14 as described above, is effective in receiving and holding the battery 13 therein. When service, replacement, or withdrawal for re-charging of the battery 13 become necessary, the vehicle operator has to remove the tread board 11 and the reinforcement member 15 first and then, the battery box 14 that is in a lying condition must be erected. In other words, the battery box 14 must be lifted to show an erected with respect to the receiving space 12, and then, the vehicle operator is allowed to lift and remove the battery 13 located in the battery box 14. Such an operation of first removing the tread board 11 and the reinforcement member 15 and then erecting the battery box 14 in order to lift and remove the battery 13, on the one hand, causes engineering complexity of removing the tread board 11 and the reinforcement member 15, and, on the other hand, with the battery 13 being received in the battery box 14, movement of the electric vehicle 1 may generate inertial forces resulting in frontward and rearward rushing, so that the frontward and rearward inertial rushing forces would cause minute displacement of the battery 13 for rushing frontward in the battery box 14 thereby leading to instability of storage position of the battery 13 and easy damage resulting from impact with the vehicle body.

Thus, it is a challenge of the electric vehicle manufacturers to provide a protection cover of a battery box of an electric vehicle that makes lifting and removal of a battery from an electric vehicle easy and enhances stability of storage position of the battery inside a battery box.

SUMMARY OF THE INVENTION

The primary objective of the present invention is to provide a protection cover of a battery box of an electric vehicle, which overcomes the drawback that in a known electric vehicle, a battery received in a battery box may not have a stable storage position.

For such a purpose, the primary technical solution of the present invention as proposed in claim 1 is to provide a protection cover of a battery box of an electric vehicle, wherein the electric vehicle at least comprises a frame unit and a vehicle body cover unit; the frame unit comprises tread tubes extending toward a rear side of a vehicle body, the tread tubes being arranged pairwise at left and right sides, respectively, as a left tread tube and a right tread tube; the vehicle body cover unit at least comprises a tread board that shields the left tread tube and the right tread tube; the frame unit receives a battery box that receives and holds therein a battery to be pivotally supported thereon, the battery box having two sides that are provided with support shafts, the battery box being shaft-supported by the support shafts on the frame unit, wherein the battery box comprises a battery access opening, and the battery access opening is provided with a protection cover that covers and closes the battery access opening.

For such a purpose, the primary technical solution of the present invention as proposed in claim 2 is to provide a protection cover of a battery box of an electric vehicle, wherein the tread tubes are provided thereon with shaft support braces; the battery box is provided, on one side thereof, with an opening device, the opening device comprising a power unit and a driven element drivable by the power unit; the power unit is arranged on the shaft support braces of the tread tubes, and the driven element is arranged on one side of a circumference of the battery box; the power unit comprises a power motor section and a transmission section, the driven element being set in engagement with the transmission section.

For such a purpose, the primary technical solution of the present invention as proposed in claim 3 is to provide a protection cover of a battery box of an electric vehicle, wherein the tread tubes are provided thereon with shaft support braces, the shaft support braces being provided with pivoting sections and shaft support sections; the battery box is shaft-supported by the support shafts on the shaft support sections; the protection cover is provided, on a lower end thereof, with a pivotal joint section, the pivotal joint section being pivotally mounted by a pivot rod to the pivoting sections of the shaft support braces; the pivot rod has two ends respectively sleeved with spring elements, two ends of the spring elements being respectively supported on the pivoting sections and the pivotal joint section.

For such a purpose, the primary technical solution of the present invention as proposed in claim 4 is to provide a protection cover of a battery box of an electric vehicle, wherein the protection cover is provided, on two side portions thereof, with sidewall sections, the sidewall sections being pivotally provided with hooking members, the hooking members comprising hook sections, the hook sections having front ends having upper edges that are formed with guide sections in an inclined condition, the hooking members and the sidewall sections being provided therebetween with spring elements; the battery box has two sides that are provided with hooking pegs projecting therefrom and corresponding to the hooking members, the hooking members being arranged to hook on and engage with the hooking pegs.

For such a purpose, the primary technical solution of the present invention as proposed in claim 5 is to provide a protection cover of a battery box of an electric vehicle, wherein the sidewall sections on the two side portions of the protection cover have front ends that are formed with slightly inclined lead-in sections; the battery box is provided, on two sides thereof, with guiding pegs corresponding to the lead-in sections of the protection box.

For such a purpose, the primary technical solution of the present invention as proposed in claim 6 is to provide a protection cover of a battery box of an electric vehicle, wherein the guiding pegs are sleeved with rollers that are freely rotatable, the guiding pegs being arranged to press on the lead-in sections.

For such a purpose, the primary technical solution of the present invention as proposed in claim 7 is to provide a protection cover of a battery box of an electric vehicle, wherein the protection cover is provided with a cushioning pad fit to a circumference of a front end edge thereof facing the battery box, and the battery box is similarly provided with a cushioning pad fit to a circumference of the battery access opening.

For such a purpose, the primary technical solution of the present invention as proposed in claim 8 is to provide a protection cover of a battery box of an electric vehicle, wherein the protection cover is a U-shaped cover having a main body section and a right sidewall section and a left sidewall section projecting from two side portions of the main body section.

For such a purpose, the primary technical solution of the present invention as proposed in claim 9 is to provide a protection cover of a battery box of an electric vehicle, wherein the main body section of the protection cover is provided, on an inside thereof, with a plurality of abutting posts projecting therefrom.

The efficacy that the primary technical solution of the present invention proposed in claim 1 is that a battery is securely received and held in a battery box without movement caused by frontward and rearward inertial rushing forces and dust resistance of the battery box is improved to thereby improve utilization of an electric vehicle.

The efficacy that the primary technical solution of the present invention proposed in claim 2 is that installation of an opening device is made easy and an effect of opening and storing achieved with the opening device is ensured.

The efficacy that the primary technical solution of the present invention proposed in claim 3 is that pivotal arrangement of a protection cover is simplified and an effect of opening the protection cover is improved.

The efficacy that the primary technical solution of the present invention proposed in claim 4 is that an effect of closure for a protection cover and a battery box is ensured.

The efficacy that the primary technical solution of the present invention proposed in claim 5 is that an effect of operative linking between a protection cover and a battery box is ensured.

The efficacy that the primary technical solution of the present invention proposed in claim 6 is that an effect of guided operative linking between a protection cover and a battery box is ensured.

The efficacy that the primary technical solution of the present invention proposed in claim 7 is that closure and dustproofness of a protection cover and a battery box are improved.

The efficacy that the primary technical solution of the present invention proposed in claim 8 is that stiffness and strength of a protection cover and a covering effect of the protection cover are ensured.

The efficacy that the primary technical solution of the present invention proposed in claim 9 is that an effect of storage of a battery in a battery box is enhanced.

DETAILED DESCRIPTION OF THE PREFERRED EMBODIMENTS

Figure 1:
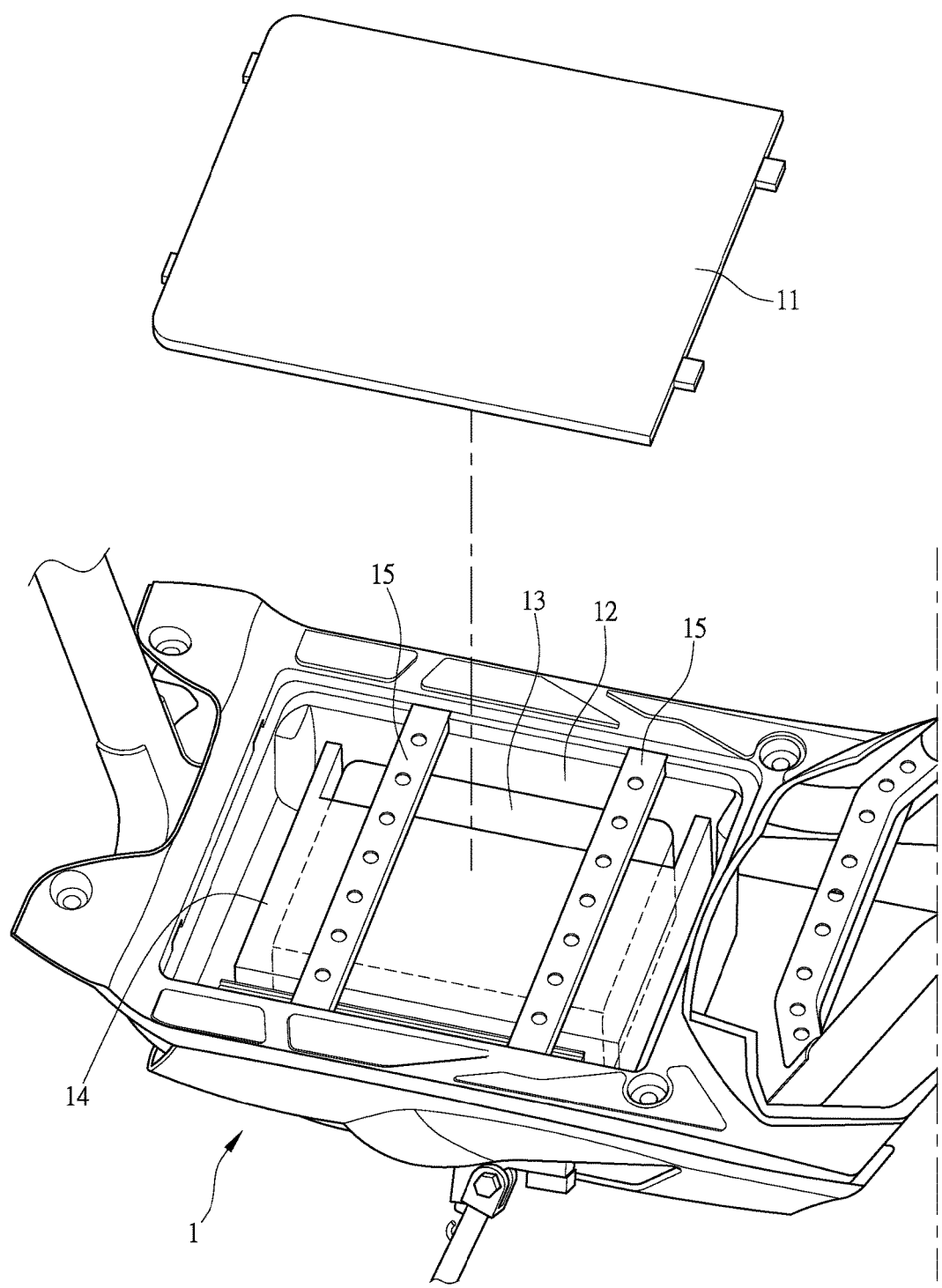
FIG. 1 is a schematic view illustrating a conventional electric vehicle battery box.
Figure 2:
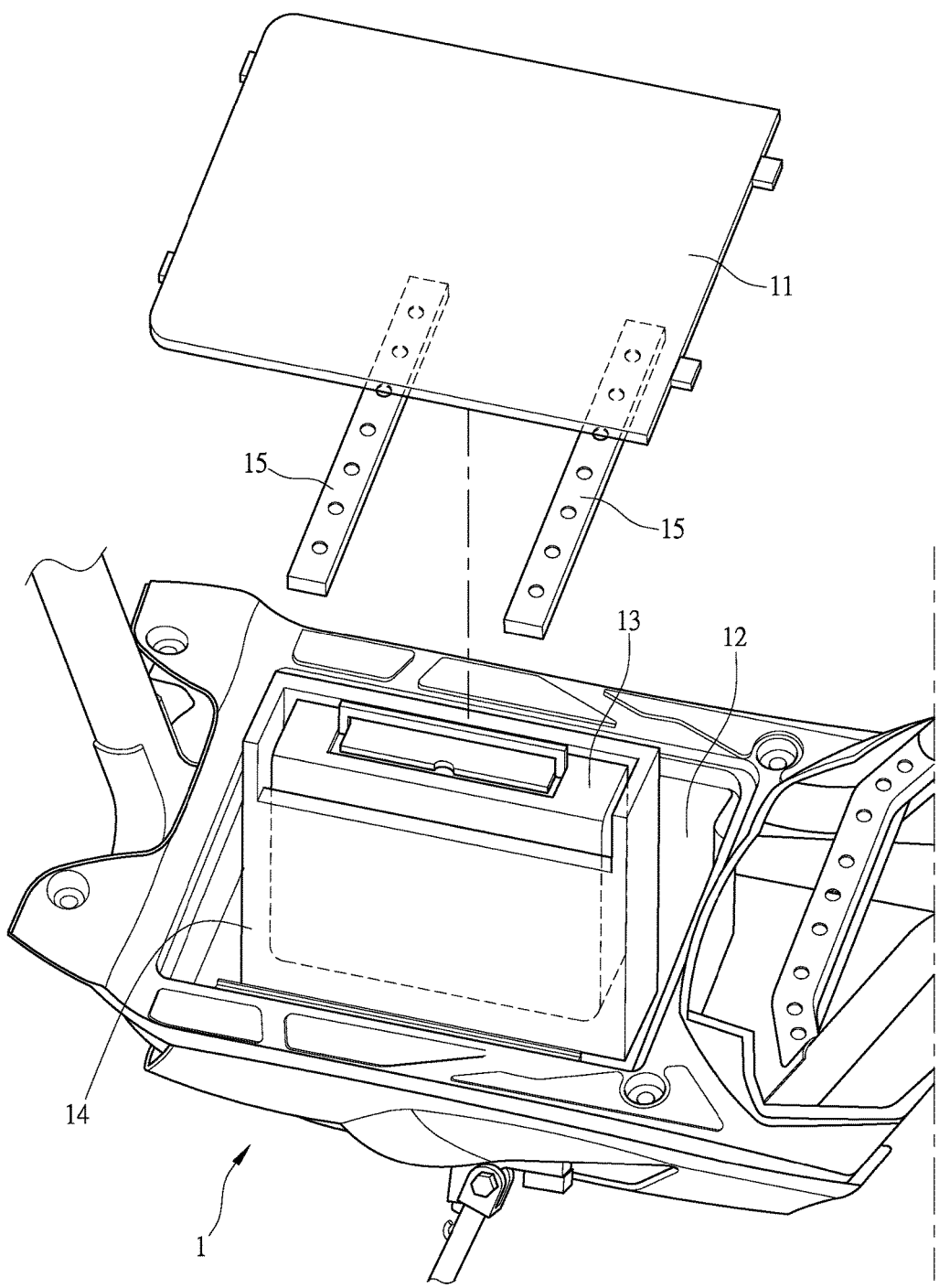
FIG. 2 is a schematic view illustrating withdrawal of the conventional electric vehicle battery box.
Figure 3:
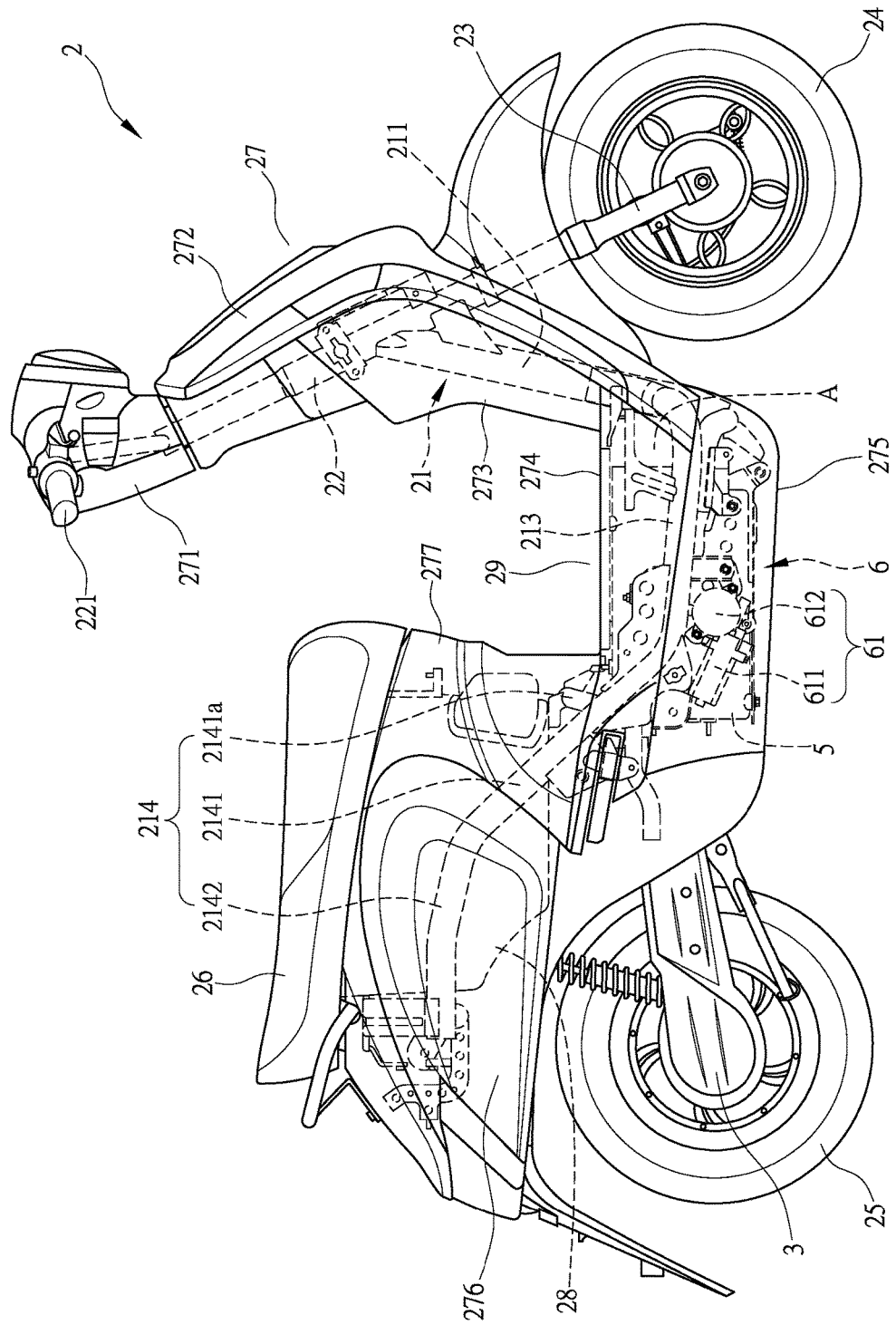
FIG. 3 is a side elevational view illustrating an electric vehicle according to the present invention.
Figure 4:
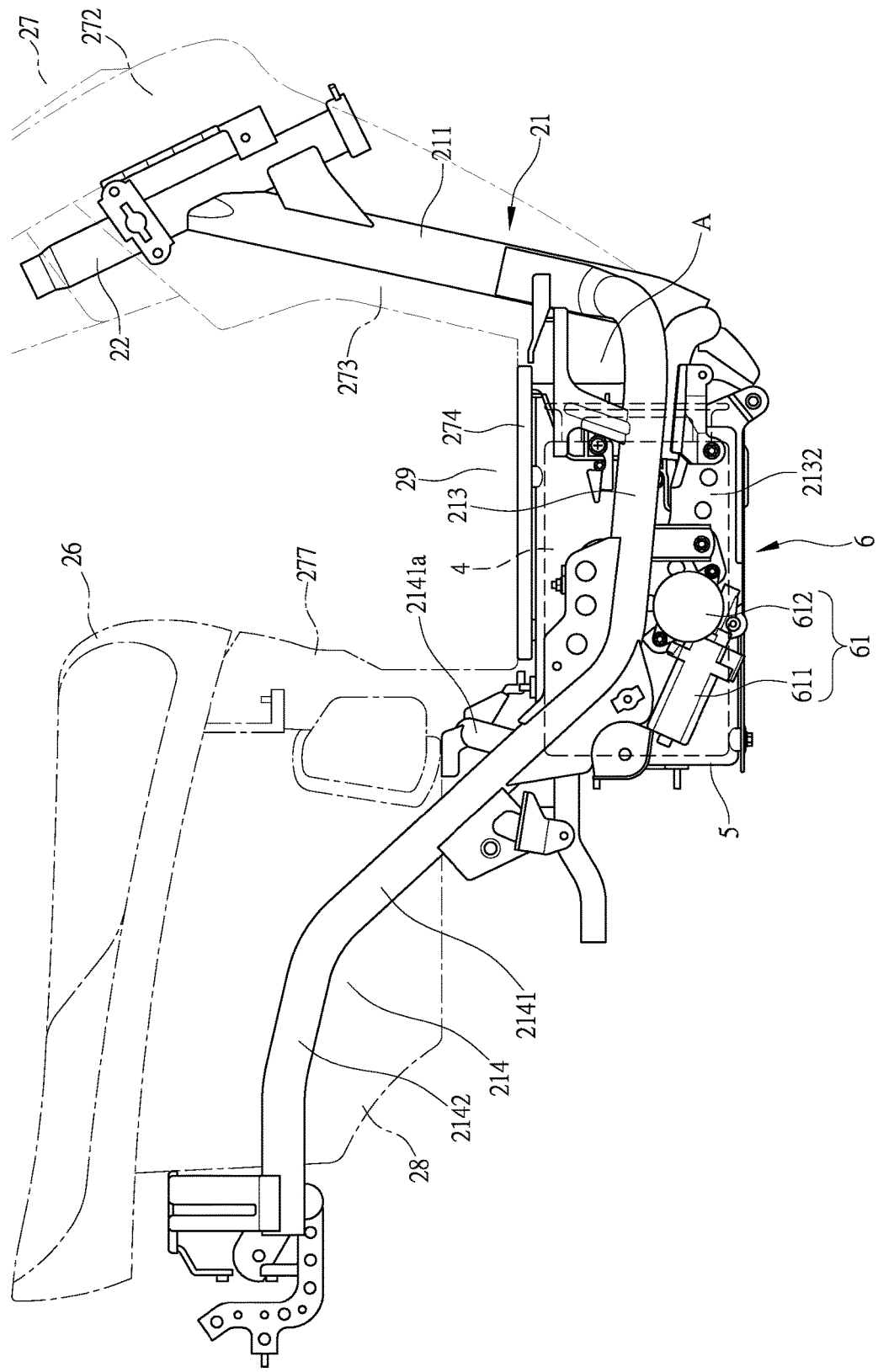
FIG. 4 is a schematic view illustrating an arrangement of a battery box of the electric vehicle according to the present invention.
Figure 5:
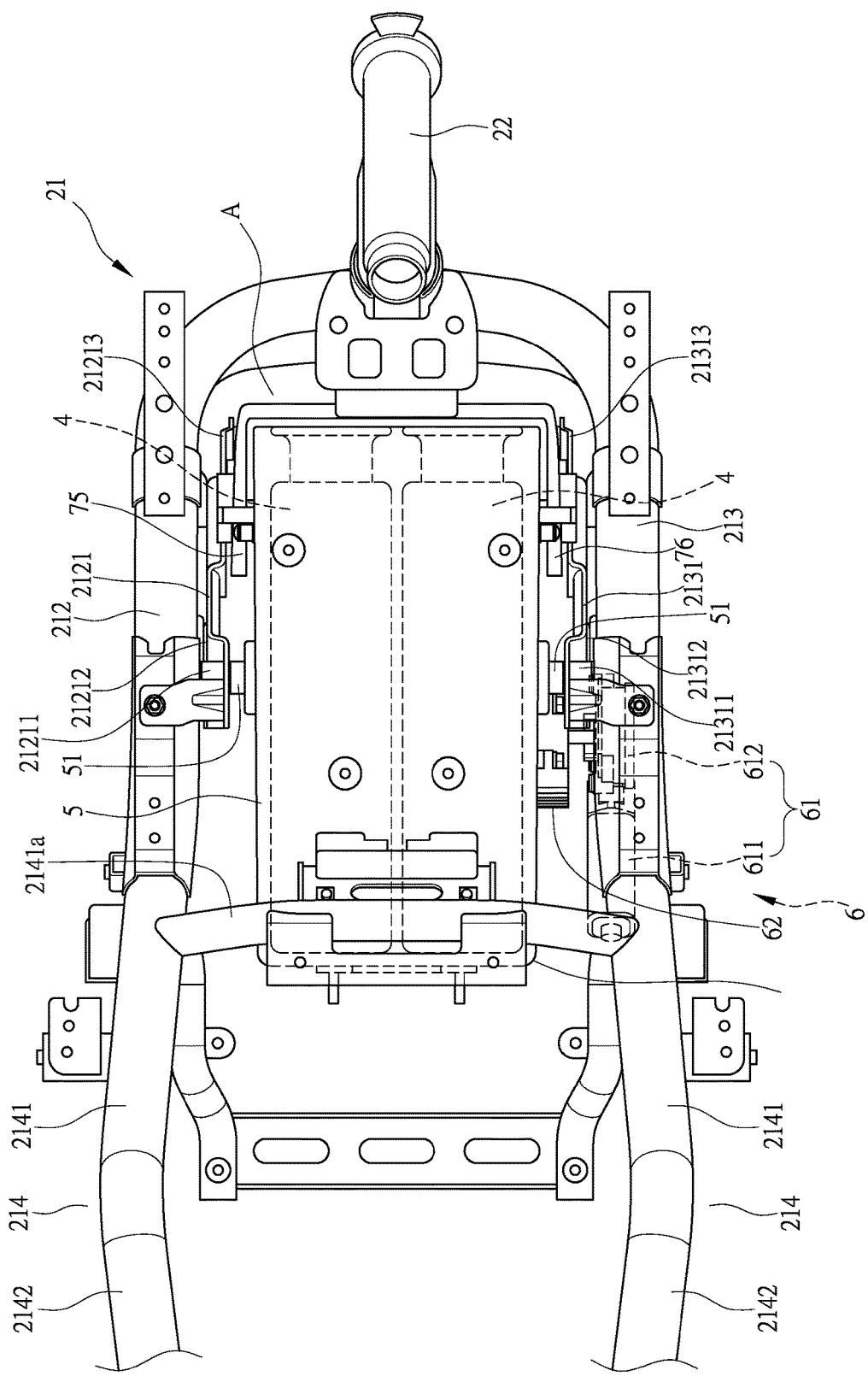
FIG. 5 is a top plan view illustrating the arrangement of the battery box of the electric vehicle according to the present invention.
Figure 6:
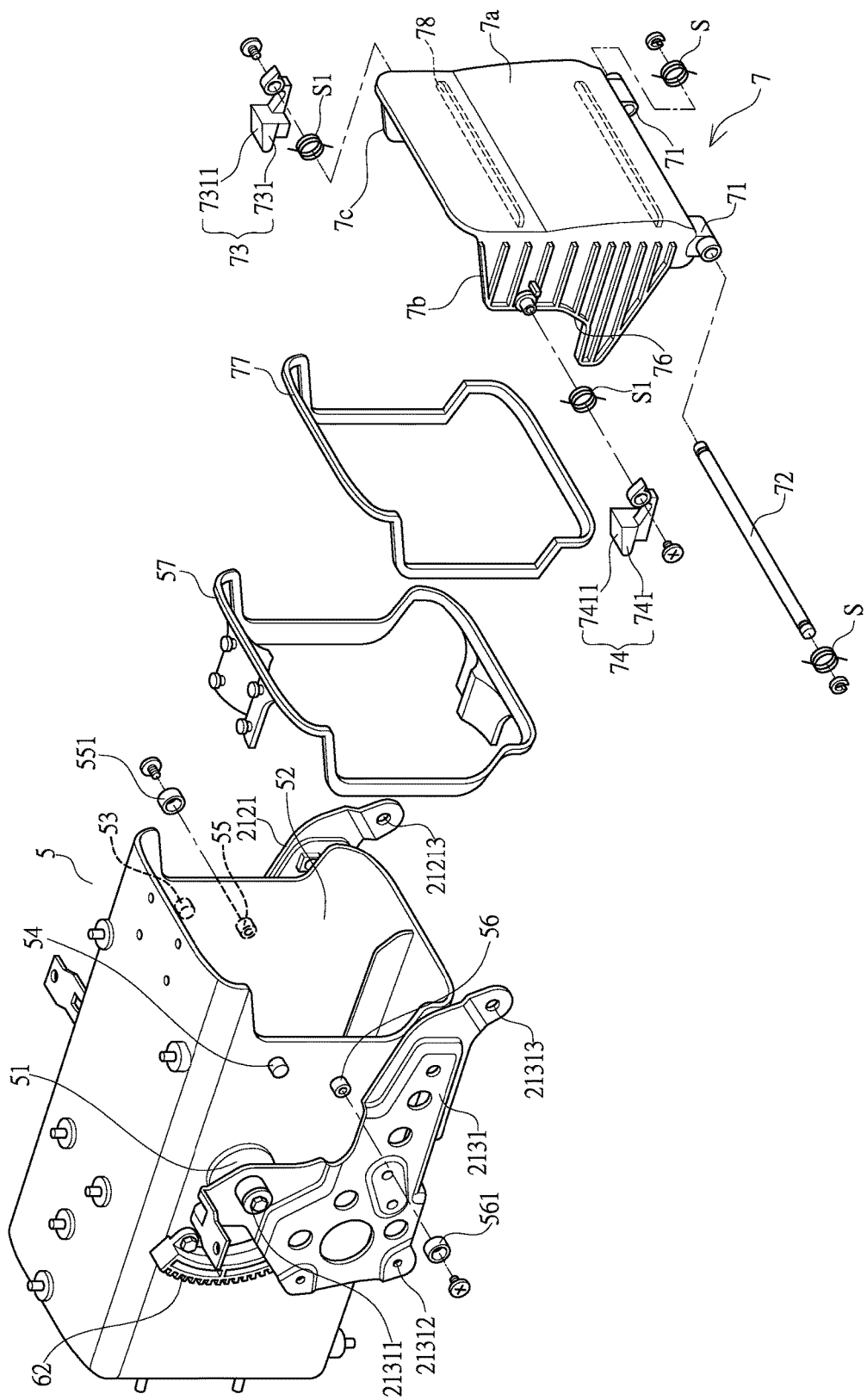
FIG. 6 is an exploded view showing a battery box and a protection cover according to the present invention.
Figure 7:
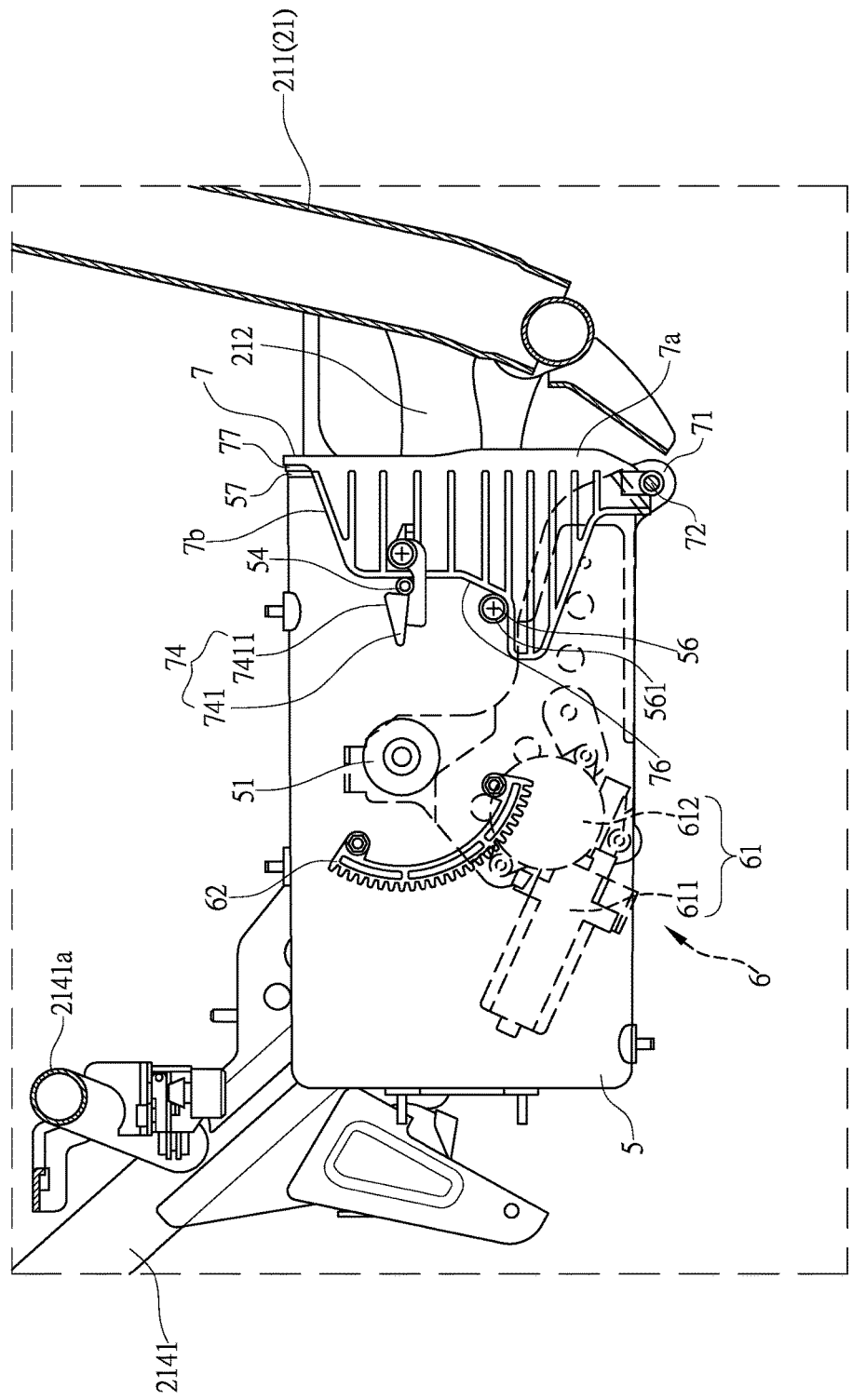
FIGS. 7-10 are schematic views illustrating an operation of the battery box of the present invention moving from a storage position to an open position.
Figure 8:
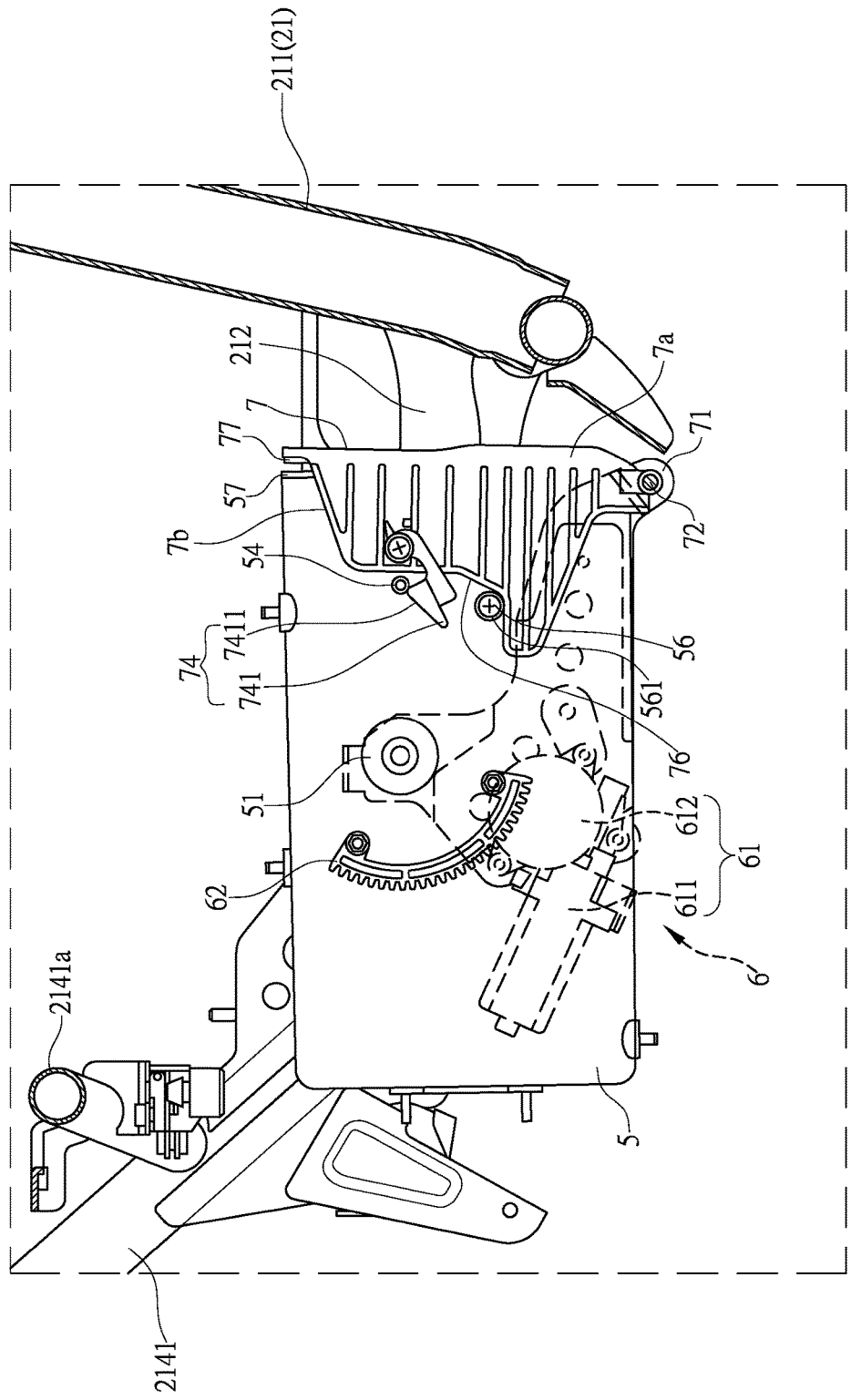
Figure 9:
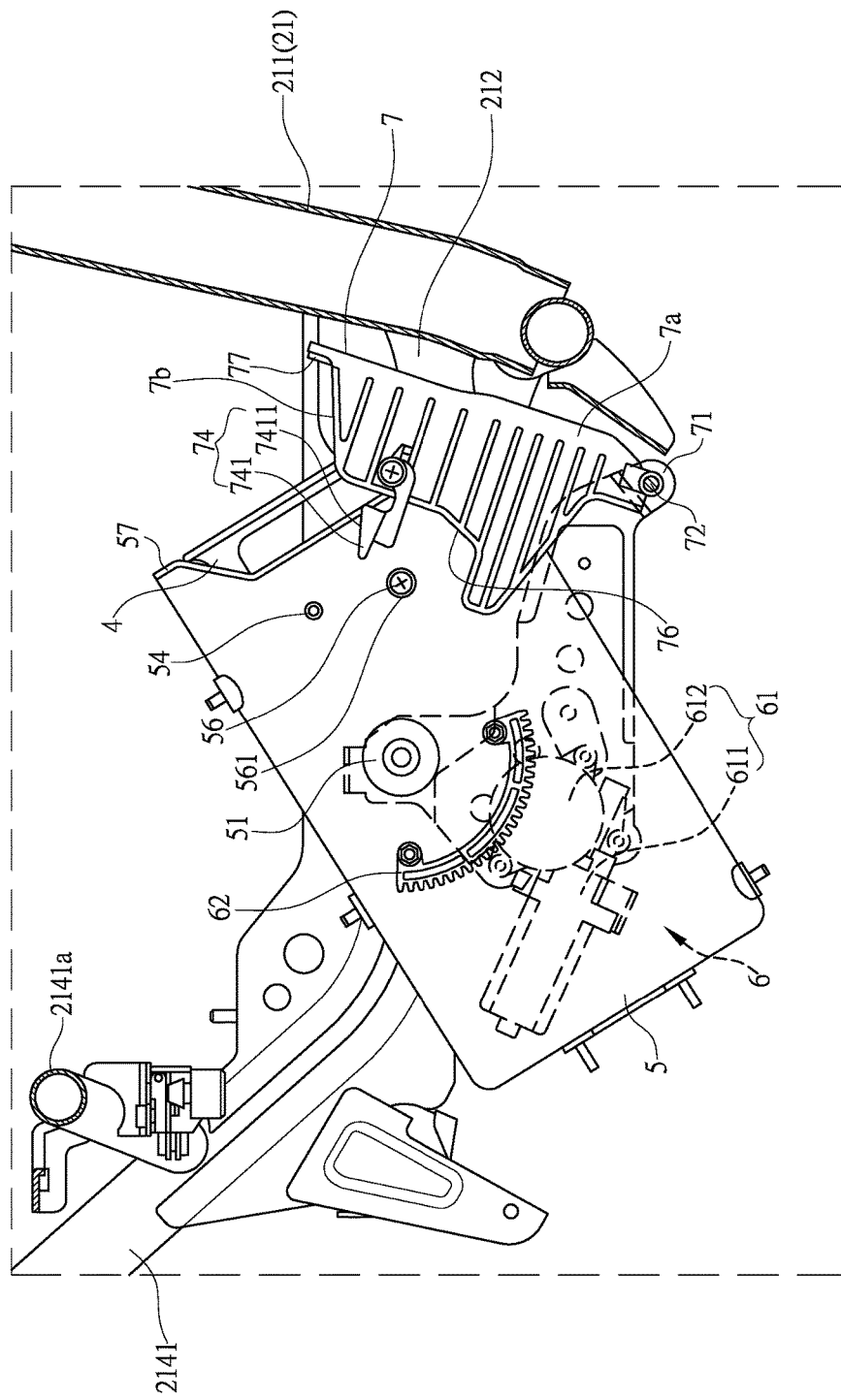
Figure 10:
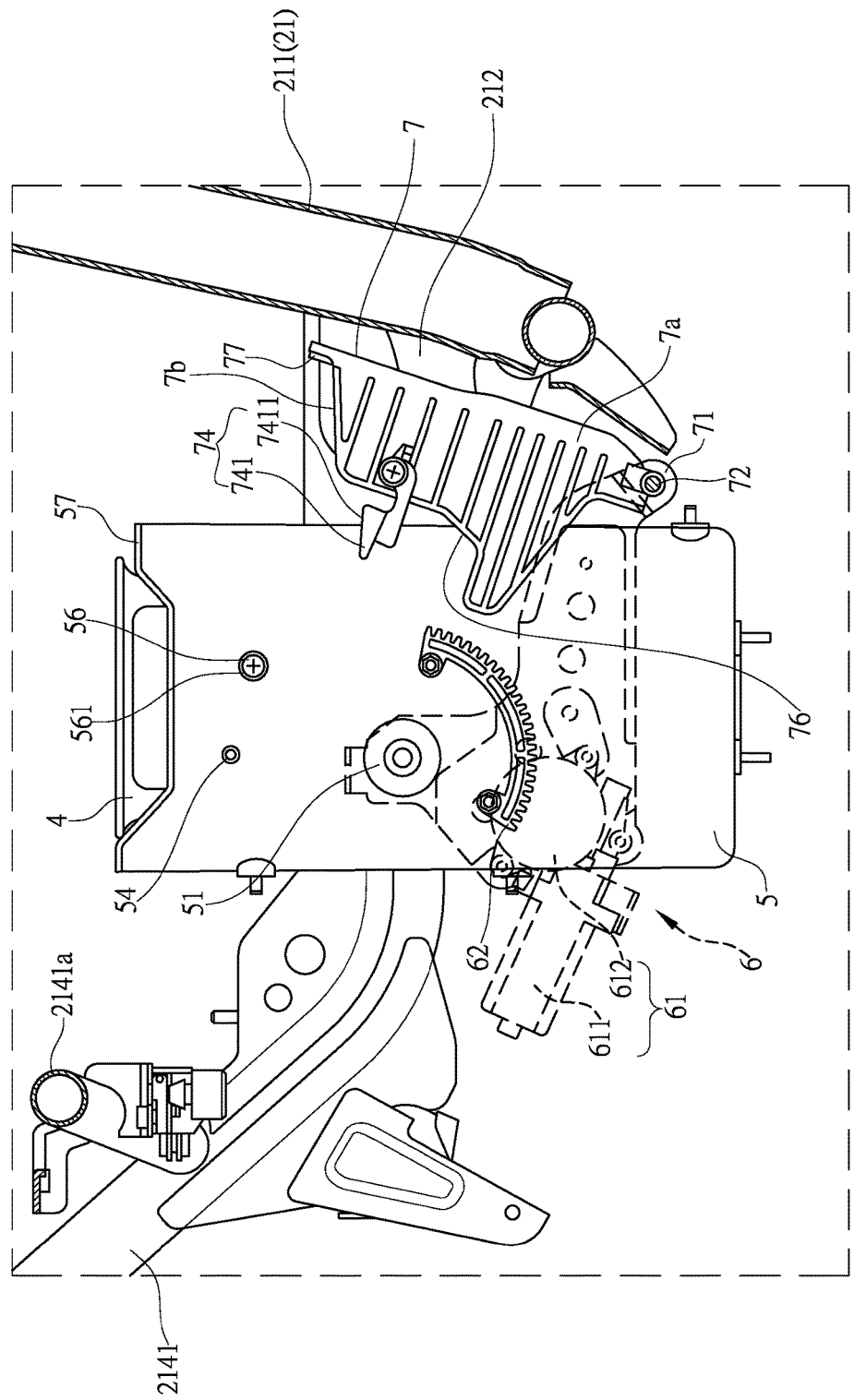
Figure 11:
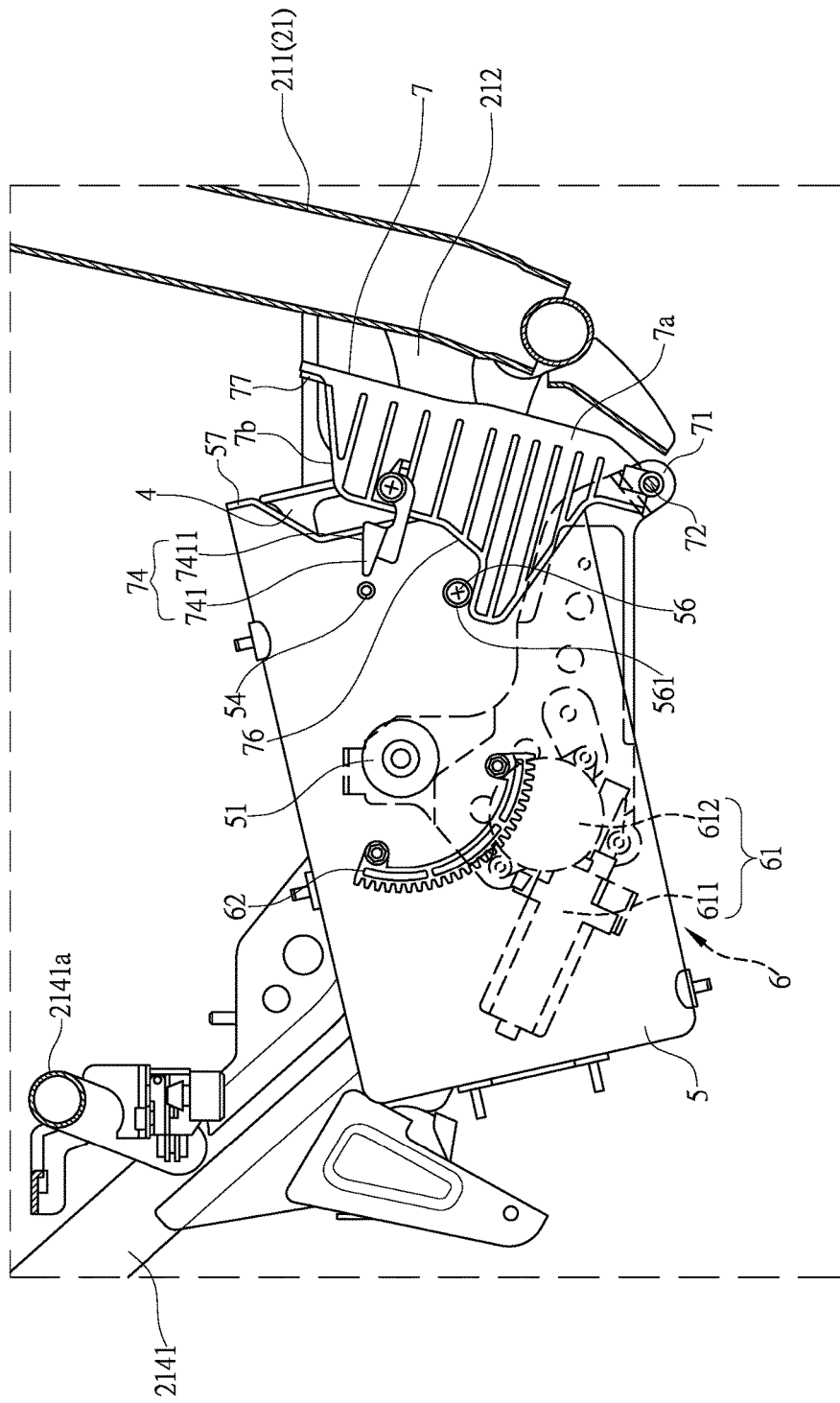
FIGS. 11-14 are schematic views illustrating an operation of the battery box of the present invention moving from the open position to the storage position.
Figure 12:
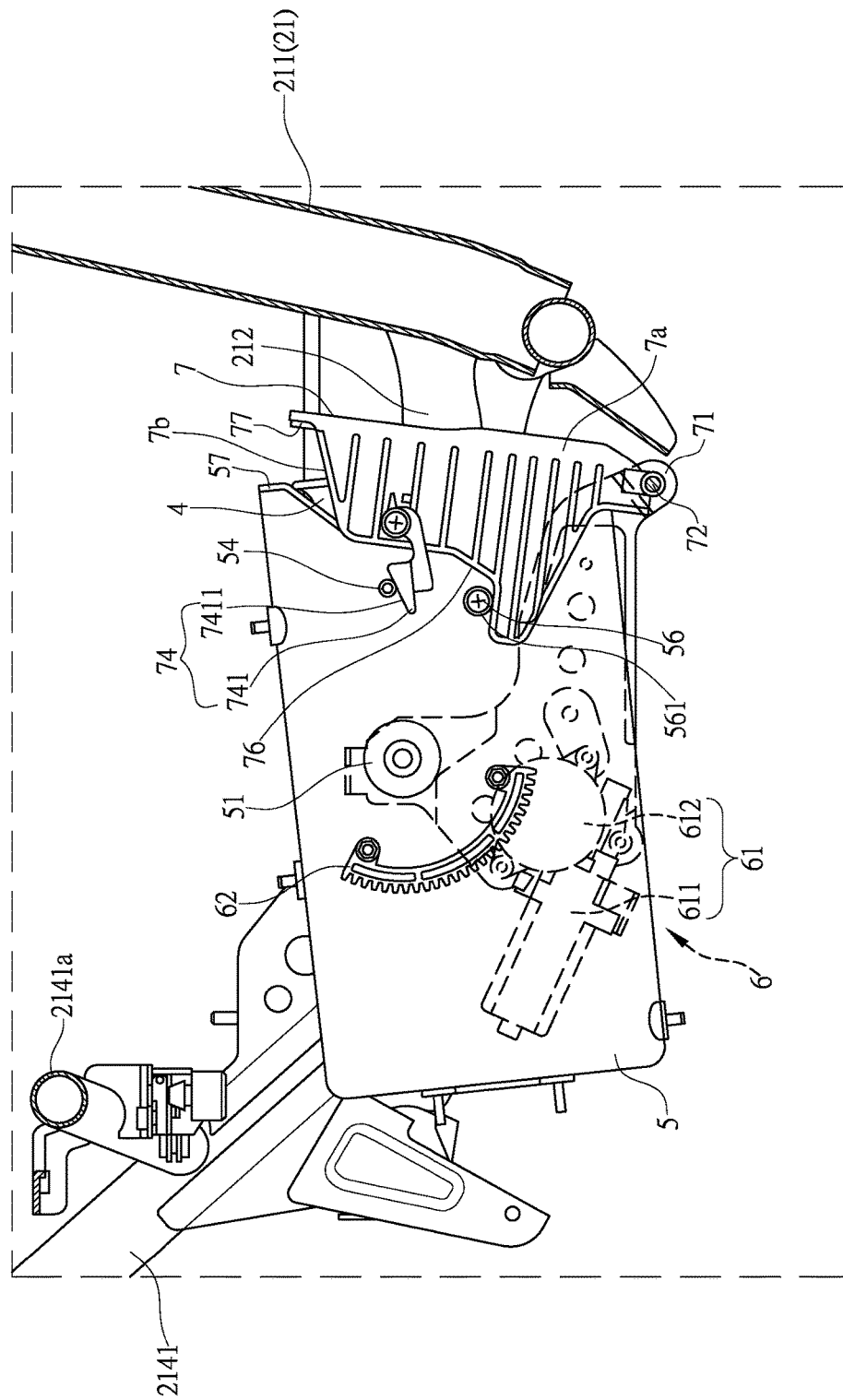
Figure 13:
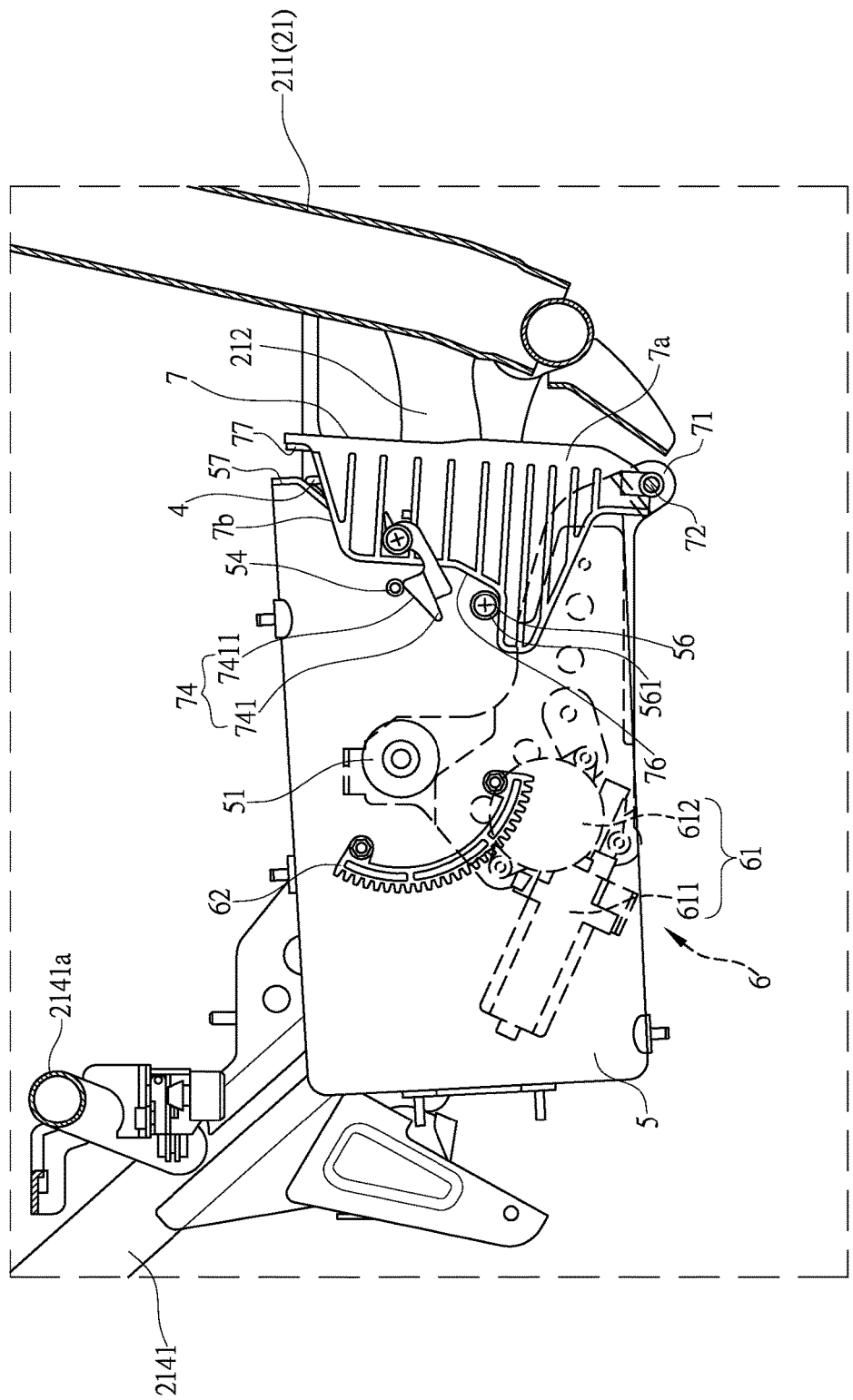
Figure 14:
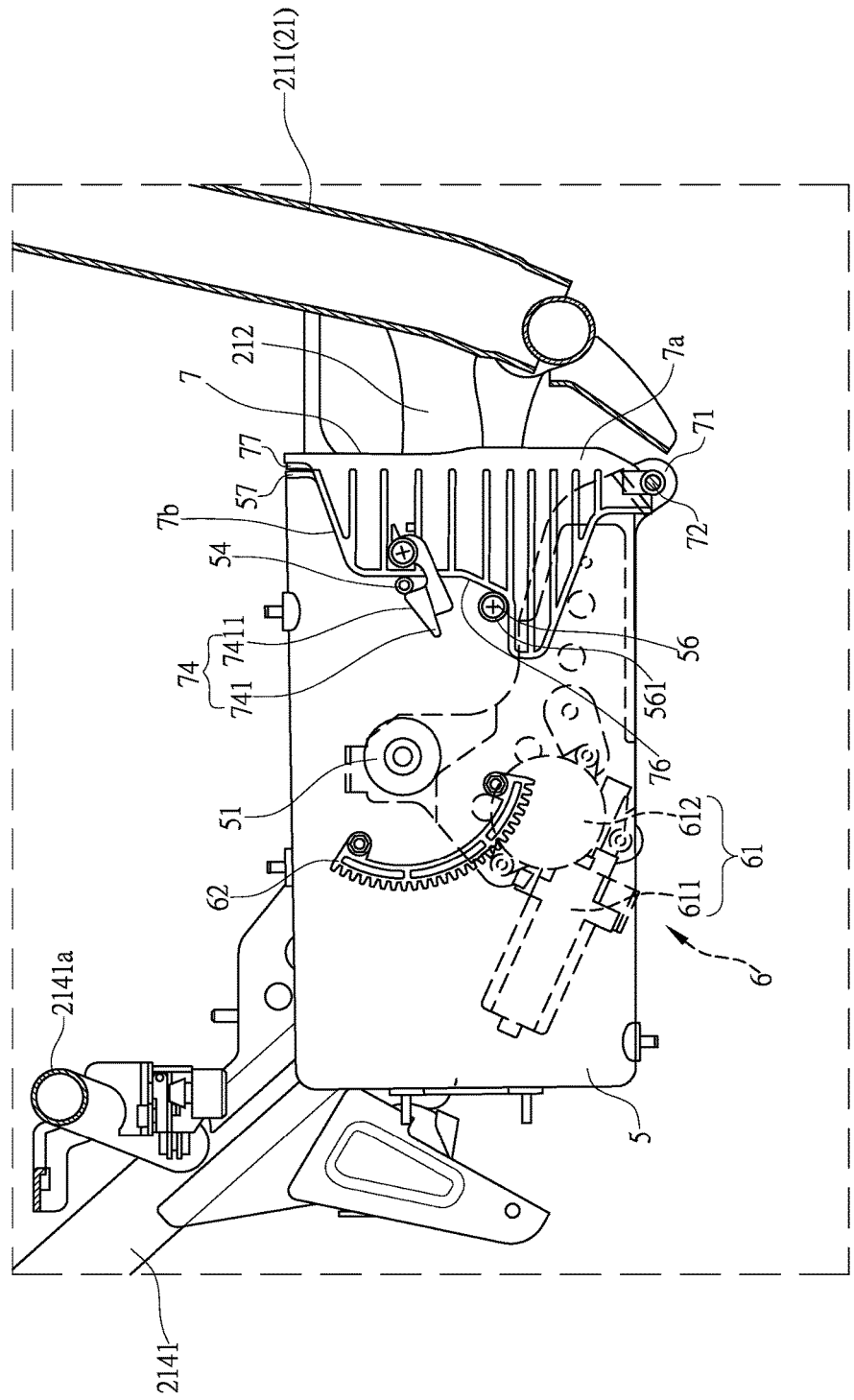

Firstly, referring to FIGS. 3, 4, and 5, the present invention provides a protection cover of a battery box of an electric vehicle. The electric vehicle 2 has a frame unit 21 that is provided, at a front side thereof, with a head tube 22. The head tube 22 is provided, at an upper side thereof, with a steering mechanism 221. The steering mechanism 221 is connected, at a lower side thereof, to a front fork unit (a front shock absorber) 23. The front fork unit 23 is provided, at a lower side thereof and in a rotatable manner, with a front wheel 24. The frame unit 21 comprises a main tube 211 extending from the head tube 22 in a direction toward a rear side of a vehicle body. The main tube 211 is provided, as being further extended toward the rear side of the vehicle body, with tread tubes, and the tread tubes are arranged pairwise at left and right sides, respectively, as a left tread tube 212 and a right tread tube 213. The left tread tube 212 and the right tread tube 213 are provided with rear frames 214 that are arranged pairwise at the left and right sides, respectively, and extend toward the rear side of the vehicle body. The rear frames 214 comprise rise sections 2141 and side frame sections 2142. A transverse tube 2141a is arranged between the rise sections 2141. A rear wheel 25 is arranged rearward of and under the rear frames 214. A driving motor 3 is arranged at one side of the rear wheel 25. The driving motor 3 is operable to drive the rear wheel 25 in order to cause the electric vehicle 2 to move forward. A seat section 26 is arranged rearward of the steering mechanism 221 and located above the rear wheel 25 and a spacing distance is provided between the seat section 26 and the steering mechanism 221. The electric vehicle 2 is provided, on an outside thereof, with a vehicle body cover unit 27. The vehicle body cover unit 27 comprises a head cover 271 housing the steering mechanism 221, a front cover 272 arranged under the head cover 271 and housing a front end of the vehicle body, and a knee-shielding cover 273 arranged rearward of the front cover 272. A tread board 274 is arranged between the steering mechanism 221 and the seat section 26 at a lower side thereof. A bottom cover 275 is arranged under the tread board 274. The electric vehicle 2 is provided, on two sides thereof, with side vehicle body covers 276 under the seat section 26. A central vehicle body cover 277 is provided under a front end portion of the seat section 26. An article storage box 28 is arranged under the seat section 26 and an upper side of the article storage box 28 is shielded by the seat section 26. The electric vehicle 2 is provided with a power source, of which an example that is shown in the drawings includes a driving motor 3 that drives the rear wheel 25. In practice, the electric vehicle 2 of the present invention can alternatively provided with a frontward-arranged motor that drives, by means of a chain or a belt, the rear wheel 25, or a driving mechanism that is made up of a motor and a transmission box to drive the rear wheel 25. It is noted here that the present invention is not limited to the specific way of driving the rear wheel 25 with the driving motor 3.

As shown in FIGS. 3, 4, and 5, the tread board 274 forms a foot support section 29, and the foot support section 29 functions to receive a rider's feet to place thereon. The tread board 274, the bottom cover 275, and the left tread tube 212 and the right tread tube 213 define a receiving space A. The receiving space A receives and holds therein a battery 4. The battery 4 is electrically connected with the driving motor 3, in order to supply electrical power to the driving motor 3 to drive the rear wheel 25 to rotate, so that a control device (not shown in the drawings) provided on the steering mechanism 221 can be operated to activate the driving motor 3 to drive the rear wheel 25 to rotate to thus cause the electric vehicle 2 to move.

As shown in FIGS. 3, 4, 5, and 6, the battery 4 is received and held in a battery box 5. The battery box 5 is received in the receiving space A defined by the left tread tube 212 and the right tread tube 213 in a manner of being arranged in a vehicle body front-rear direction of the electric vehicle 2. The left tread tube 212 is provided with a left shaft support brace 2121, and the right tread tube 213 is provided with a right shaft support brace 2131. The left shaft support brace 2121 and the right shaft support brace 2131 are of identical structures so that description will be given only to the right shaft support brace 2131 illustrated in FIG. 6. The right shaft support brace 2131 is provided on an upper part thereof with a right shaft support section 21311 (the left shaft support brace 2121 being provided with a left shaft support section 21211). The right shaft support brace 2131 is provided on a lower part thereof with a right fastening section 21312 (the left shaft support brace 2121 being provided with a left fastening section 21212). The right shaft support brace 2131 is provided, on a lower part of a front end thereof, with a right pivoting section 21313 (the left shaft support brace 2121 being provided with a left pivoting section 21213). The battery box 5 is provided, on two opposite sides thereof, with support shafts 51 projecting therefrom in a vehicle body left-right direction. The support shafts 51 that are provided on the two sides of the battery box 5 are arranged above a battery box center axis of the battery box 5 that is in the vehicle body front-rear direction. As such, the battery box 5 is shaft-supported on the left shaft support section 21211 of the left shaft support brace 2121 of the left tread tube 212 and the right shaft support section 21311 of the right shaft support brace 2131 of the right tread tube 213 by the support shafts 51 in the vehicle body left-right direction. An opening device 6 is arranged at one side of the battery box 5. A protection cover 7 is provided at a front end of the battery box 5.

As shown in FIGS. 3, 4, and 5, the opening device 6 comprises a power unit 61 and a driven element 62 that can be driven by the power unit 61. The power unit 61 is fixed to the right shaft support brace 2131 of the right tread tube 213. The power unit 61 comprises a power motor section 611 and a transmission section 612. The driven element 62 comprises a toothed member, or more precisely, a curved toothed rack. The driven element 62 is mounted to one side of the battery box 5, which is the right side shown in the drawings as an example for illustration. The driven element 62 is set in engagement with the transmission section 612 of the power unit 61. The opening device 6 can be arranged at the left side or the right side of the battery box 5, and in other words, the opening device 6 can be arranged on the left tread tube 212 or the right tread tube 213. Being arranged on the right tread tube 213 as shown in the instant embodiment is taken as an example for illustration; however, this invention is not limited to such an embodiment.

As shown in FIGS. 4, 5, 6, and 7, the protection cover 7 is a U-shaped cover that comprises a main body section 7a and a right sidewall section 7b and a left sidewall section 7c projecting from two opposite sides of the main body section 7a so that the protection cover 7 may cover and close a battery access opening 52 of the battery box 5. The protection cover 7 has a lower end that is provided with a pivotal joint section 71. The pivotal joint section 71 is pivotally connected by a pivot rod 72 to the right pivoting section 21313 of the right shaft support brace 2131 and the left pivoting section 21213 of the left shaft support brace 2121 so that the protection cover 7 may carry out an operation of rotating to upward or downward by taking the pivot rod 72 as an oscillation center. The pivot rod 72 has two ends that are respectively sleeved with spring elements S, and two ends of the spring elements S are respectively supported on the right pivoting section 21313 and the left pivoting section 21213 and the pivotal joint section 71, so that reliability of the operation of rotation the protection cover 7 to face upward and downward can be ensure. The left-side and right sidewall sections 7b, 7c on the two sides of the protection cover 7 are respectively shaft-mounted with left and right hooking members 73, 74. The left and right hooking members 73, 74 comprise hook sections 731, 741. The hook sections 731, 741 have front ends having upper sides that are formed with guide sections 7311, 7411 in an inclined condition. The left and right hooking members 73, 74 and the left and right sidewall sections 7b, 7c are provided therebetween with spring elements S1, so that the spring elements S1 ensure hooking capability of the hooking members 73, 74. The left-side and right sidewall sections 7b, 7c on the two sides of the protection cover 7 are provided on front ends thereof with slightly inclined lead-in sections 75, 76. Two sides of the battery box 5 that correspond to the hooking members 73, 74 of the protection cover 7 are respectively provided with hooking pegs 53, 54 projecting therefrom. The hooking pegs 53, 54 may receive the hooking members 73, 74 to hook thereon. The battery box 5 are provided, in a projecting form, on the two sides thereof with guiding pegs 55, 56 that correspond to the lead-in sections 75, 76 of the protection box 7. The guiding pegs 55, 56 are fit with rollers 551, 561 that are freely rotatable. The guiding pegs 55, 56 are guided to press on the lead-in sections 75, 76. The protection cover 7 is provided with a cushioning pad 77 that is fit to a circumference of a front end thereof facing the battery box 5. The battery box 5 is similarly provided with a cushioning pad 57 fit to a circumference of the battery access opening 52. The main body section 7a of the protection cover 7 is provide, on an inside thereof, with a plurality of abutting posts 78 projecting in a direction toward the battery box 5. The abutting posts 78 are provided for being abutted with the battery 4 received in the battery box 5.

As shown in FIGS. 3, 4, 7, 8, 9, and 10, a user, when attempting to remove the battery 4 from the battery box 5, operates the opening device 6 to have the battery box 5 rotated about a rotation center defined by the support shafts 51 in the receiving space A in a direction towards the rear side of the vehicle body and the battery box 5 is from the storage position of a horizontally received condition, where the hooking pegs 53, 54 of the battery box 5 are hooked on by the hook sections 731, 741 of the hooking members 73, 74 of the protection cover 7 and the guiding pegs 55, 56 of the battery box 5 are located at an innermost site of the lead-in sections 75, 76 of the protection cover 7 (namely the nearest locations close to the main body section 7a). When the opening device 6 drives the battery box 5 to gradually rotate, about the rotation center defined by the support shafts 51, in a direction toward the rear side of the vehicle body, the hooking pegs 53, 54 of the battery box 5 gradually press against the hook sections 731, 741 of the hooking members 73, 74 of the protection cover 7 so as to force the hooking members 73, 74 of the protection cover 7 to gradually rotate downward, and at the same time, the guiding pegs 55, 56 of the battery box 5 gradually move outward from the innermost sites of the lead-in sections 75, 76 of the protection cover 7 (namely moving away from the main body section 7a), so that the battery box 5 rotates toward the rear side of the vehicle body and at the same time forces the protection cover 7 to incline, with the pivot rod 72 as an axis, in a direction toward a front side of vehicle body until the battery box 5 reaches an open position of being generally defining a right angle with respect to a ground surface, whereby a user may readily lift and remove the battery 4 from the battery box 5.

As shown in FIGS. 3, 4, 7, 11, 12, 13, and 14, in case that the user attempts to re-deposit the battery 4 into the battery box 5 and to have the battery box 5 received and held in the receiving space A by similarly operating the opening device 6 to have the battery box 5 rotated about the rotation center defined by the support shafts 51 in the receiving space A toward the front side of the vehicle body to be set in a storage position, under a condition that the battery box 5 shows the open position of generally defining a right angle with respect to the ground surface, when the opening device 6 drives the battery box 5 to gradually rotate about the rotation center defined by the support shafts 51 in a direction toward the front side of the vehicle body, the guiding pegs 55, 56 of the battery box 5 gradually move inward from outermost sites of the lead-in sections 75, 76 of the protection cover 7 (namely approaching the main body section 7a), so that the battery box 5 rotates in a direction toward the front side of the vehicle body and at the same time, the guiding pegs 55, 56 of the battery box 5 are forced to press against the lead-in sections 75, 76 of the protection cover 7, and the protection cover 7 is caused to incline, with the pivot rod 72 as an axis, toward the rear side of the vehicle body, and when the battery box 5 gradually rotates in a direction toward the front side of the vehicle body again, the hooking pegs 53, 54 of the battery box 5 gradually press on the guide sections 7311, 7411 of the hook sections 731, 741 of the hooking members 73, 74 of the protection cover 7 to cause the hooking members 73, 74 of the protection cover 7 to be gradually forced to rotate downward, and when the hooking pegs 53, 54 of the battery box 5 pass over upper ends of the guide sections 7311, 7411 of the hook sections 731, 741 of the hooking members 73, 74 of the protection cover 7, namely the guiding pegs 55, 56 of the battery box 5 returning to the innermost sites of the lead-in sections 75, 76 of the protection cover 7 (namely locations close to the main body section 7), the hook sections 731, 741 of the hooking members 73, 74 of the protection cover 7 are caused by the spring forces of the spring elements S1 to hook on the hooking pegs 53, 54 of the battery box 5, and under such a condition, the battery box 5 is received, in a generally horizontal condition, in the receiving space A. The protection cover 7 uses the hooking members 73, 74, on an upper art thereof, to hook on the hooking pegs 53, 54 of the battery box 5, while having a lower part thereof pivotally mounted by the pivot rod 72 so as to be securely set on and cover the battery access opening 52 of the battery box 5, and meanwhile, the plurality of abutting posts 78 provided on and projecting from the main body section 7a of the protection cover 7 abut against the battery 4, so that the battery 4 is securely received and held in the battery box 5 without undesired movement caused by frontward and rearward inertial rushing forces and concealment and dust resistance of the battery box 5 are improved.

The primary efficacy of the present invention is that a battery box 5 comprises a battery access opening 52, and the battery access opening 52 is provided with a protection cover 7 that covers and closes the battery access opening 52 so that the battery 4 is securely received and held in the battery box 5 without movement caused by frontward and rearward inertial rushing forces and dust resistance of the battery box 5 is improved to thereby improve utilization of the electric vehicle 2.

The second efficacy of the present invention is that left and right tread tubes 212, 213 are provided thereon with left and right shaft support braces 2121, 2131; the battery box 5 is provided, on one side thereof, with an opening device 6, the opening device 6 comprising a power unit 61 and a driven element 62 drivable by the power unit 61; the power unit 61 is arranged on the right tread tube 213 and the driven element 62 is arranged on one side of a circumference of the battery box 5, the power unit 61 comprising a power motor section 611 and a transmission section 612, the driven element 62 being set in engagement with the transmission section 611, so that installation of the opening device 6 is made easy and an effect of opening and storing achieved with the opening device 6 is ensured.

The third efficacy of the present invention is that left and right tread tubes 212, 213 are provided thereon with left and right shaft support braces 2121, 2131, the left and right shaft support braces 2121, 2131 being provided with left and right pivoting sections 21213, 21313 and left and right shaft support sections 21211, 21311; the battery box 5 is shaft-supported by support shafts 51 on the left and right shaft support sections 21211, 21311; the protection cover 7 is provided, on a lower end thereof, with a pivotal joint section 71, the pivotal joint section 71 being pivotally mounted by a pivot rod 72 to the left and right pivoting sections 21213, 21313 of the left and right shaft support braces 2121, 2131; the pivot rod 72 has two ends respectively sleeved with spring elements S, two ends of the spring elements S being respectively supported on the left and right pivoting sections 21213, 21313 and the pivotal joint section 71 so that pivotal arrangement of the protection cover 7 is simplified and an effect of opening the protection cover 7 is improved.

The fourth efficacy of the present invention is that a protection cover 7 is provided, on two side portions thereof with sidewall sections 7b, 7c, the sidewall sections 7b, 7c being pivotally provided with hooking members 73, 74, the hooking members 73, 74 comprising hook sections 731, 741, the hook sections 731, 741 having front ends having upper edges that are formed with guide sections 7311, 7411 in an inclined condition, the hooking members 73, 74 and the sidewall sections 7*b*, 7*c* being provided therebetween with spring elements S1; the battery box 5 has two sides that are provided with hooking pegs 53, 54 projecting therefrom and corresponding to the hooking members 73, 74, the hooking members 73, 74 being arranged to hook on and engage with the hooking pegs 53, 54 so that an effect of covering achieved between the protection cover 7 and the battery box 5 is ensured.

The fifth efficacy of the present invention is that sidewall sections 7*b*, 7*c* provided on two side portions of a protection cover 7 have front ends that are formed with slightly inclined lead-in sections 75, 76; the battery box 5 are provided, on two sides thereof, with guiding pegs 55, 56 corresponding to the lead-in sections 75, 76 of the protection box 7 so that an effect of operative linking between the protection cover 7 and the battery box 5 is ensured.

The sixth efficacy of the present invention is that guiding pegs 55, 56 are sleeved with rollers 551, 561 that are freely rotatable, the guiding pegs 55, 56 being arranged to press on the lead-in sections 75, 76 that an effect of guided operative linking between the protection cover 7 and the battery box 5 is ensured.

The seventh efficacy of the present invention is that a protection cover 7 is provided with a cushioning pad 77 fit to a circumference of a front end edge thereof facing the battery box 5 and the battery box 5 is similarly provided with a cushioning pad 57 fit to a circumference of a battery access opening 52 so that closure and dustproofness of the protection cover 7 and the battery box 5.

The eighth efficacy of the present invention is that a protection cover 7 is a U-shaped cover having a main body section 7*a* and a right sidewall section 7*b* and a left sidewall section 7*c* projecting from two side portions of the main body section 7*a* so that stiffness and strength of the protection cover 7 and a covering effect of the protection cover 7 are ensured.

The ninth efficacy of the present invention is that a main body section 7*a* of a protection cover 7 is provided, on an inside thereof, with a plurality of abutting posts 78 projecting therefrom so that an effect of storage of a battery 4 in a battery box 5 is enhanced.

The tenth efficacy of the present invention is that a central vehicle body cover 277 is arranged under a front end of a seat section 26 and when a battery box 5 is received in a receiving space A defined by a left tread tube 212, a right tread tube 213, a tread board 274, and a bottom cover 275, a rear portion of the battery box 5 has at least a part extending further toward a rear side of a vehicle body than the central vehicle body cover 277 so that interference of the battery box 5 as being enlarged with other components is avoided to thereby enhance utilization of the battery box 5.

We claim:

1. A protection cover of a battery box of an electric vehicle, wherein the electric vehicle at least comprises a frame unit and a vehicle body cover unit; the frame unit comprises tread tubes extending toward a rear side of a vehicle body, the tread tubes being arranged pairwise at left and right sides, respectively, as a left tread tube and a right tread tube; the vehicle body cover unit at least comprises a tread board that shields the left tread tube and the right tread tube; the frame unit receives a battery box that receives and holds therein a battery pivotally supported thereon, the battery box having two sides that are provided with support shafts, the battery box being shaft-supported by the support shafts on the frame unit, wherein the battery box comprises a battery access opening, and the battery access opening is provided with a protection cover that covers and closes the battery access opening.

2. The protection cover of the battery box of the electric vehicle according to claim 1, wherein the tread tubes are provided thereon with shaft support braces; the battery box is provided, on one side thereof, with an opening device, the opening device comprising a power unit and a driven element drivable by the power unit; the power unit is arranged on the shaft support braces of the tread tubes, and the driven element is arranged on one side of a circumference of the battery box; the power unit comprises a power motor section and a transmission section, the driven element being set in engagement with the transmission section.

3. The protection cover of the battery box of the electric vehicle according to claim 1, wherein the tread tubes are provided thereon with shaft support braces, the shaft support braces being provided with pivoting sections and shaft support sections; the battery box is shaft-supported by the support shafts on the shaft support sections; the protection cover is provided, on a lower end thereof, with a pivotal joint section, the pivotal joint section being pivotally mounted by a pivot rod to the pivoting sections of the shaft support braces; the pivot rod has two ends respectively sleeved with spring elements, two ends of the spring elements being respectively supported on the pivoting sections and the pivotal joint section.

4. The protection cover of the battery box of the electric vehicle according to claim 1, wherein the protection cover is provided, on two side portions thereof, with sidewall sections, the sidewall sections being pivotally provided with hooking members, the hooking members comprising hook sections, the hook sections having front ends having upper edges that are formed with guide sections in an inclined condition, the hooking members and the sidewall sections being provided therebetween with spring elements; the battery box has two sides that are provided with hooking pegs projecting therefrom and corresponding to the hooking members, the hooking members being arranged to hook on and engage with the hooking pegs.

5. The protection cover of the battery box of the electric vehicle according to claim 4, wherein the sidewall sections on the two side portions of the protection cover have front ends that are formed with slightly inclined lead-in sections; the battery box is provided, on two sides thereof, with guiding pegs corresponding to the lead-in sections of the protection box.

6. The protection cover of the battery box of the electric vehicle according to claim 5, wherein the guiding pegs are sleeved with rollers that are freely rotatable, the guiding pegs being arranged to press on the lead-in sections.

7. The protection cover of the battery box of the electric vehicle according to claim 5, wherein the protection cover is provided with a cushioning pad fit to a circumference of a front end edge thereof facing the battery box, and the battery box is similarly provided with a cushioning pad fit to a circumference of the battery access opening.

8. The protection cover of the battery box of the electric vehicle according to claim 1, wherein the protection cover is a U-shaped cover having a main body section and a right sidewall section and a left sidewall section projecting from two side portions of the main body section.

9. The protection cover of the battery box of the electric vehicle according to claim 8, wherein the main body section of the protection cover is provided, on an inside thereof, with a plurality of abutting posts projecting therefrom.

10. The protection cover of the battery box of the electric vehicle according to claim 3, wherein the protection cover is provided, on two side portions thereof, with sidewall sections, the sidewall sections being pivotally provided with hooking members, the hooking members comprising hook sections, the hook sections having front ends having upper edges that are formed with guide sections in an inclined condition, the hooking members and the sidewall sections being provided therebetween with spring elements; the battery box has two sides that are provided with hooking pegs projecting therefrom and corresponding to the hooking members, the hooking members being arranged to hook on and engage with the hooking pegs.

11. The protection cover of the battery box of the electric vehicle according to claim 10, wherein the sidewall sections on the two side portions of the protection cover have front ends that are formed with slightly inclined lead-in sections; the battery box is provided, on two sides thereof, with guiding pegs corresponding to the lead-in sections of the protection box.

12. The protection cover of the battery box of the electric vehicle according to claim 11, wherein the guiding pegs are sleeved with rollers that are freely rotatable, the guiding pegs being arranged to press on the lead-in sections.

13. The protection cover of the battery box of the electric vehicle according to claim 11, wherein the protection cover is provided with a cushioning pad fit to a circumference of a front end edge thereof facing the battery box, and the battery box is similarly provided with a cushioning pad fit to a circumference of the battery access opening.

\* \* \* \* \*